Jan. 24, 1961 G. J. SYKOKIS 2,969,138
CONVEYOR MULTIPLE DRIVE MECHANISM
Filed Feb. 20, 1958 2 Sheets-Sheet 1

INVENTOR.
George John Sykokis

By Shoemaker and Mattare
ATTORNEYS

Jan. 24, 1961 G. J. SYKOKIS 2,969,138
CONVEYOR MULTIPLE DRIVE MECHANISM
Filed Feb. 20, 1958 2 Sheets-Sheet 2

INVENTOR.
George John Sykokis
BY
ATTORNEYS

United States Patent Office 2,969,138
Patented Jan. 24, 1961

2,969,138
CONVEYOR MULTIPLE DRIVE MECHANISM

George John Sykokis, 28 Ierosolymon St., Athens, Greece

Filed Feb. 20, 1958, Ser. No. 716,494

4 Claims. (Cl. 198—208)

This invention relates to chain conveyors and particularly to those including multiple driving elements and comprising an endless articulated conveyor chain moving in engagement with guide rails, and concerns improvements of the multiple driving elements for the purpose of reducing to a minimum the deterioration of the working surfaces of the link-plates and the pins, to avoid substantial slackness in the articulations of the conveyor chain.

This invention is a second continuation in part of my pending application No. 322,951, now abandoned, for Conveyor Driving Mechanism, filed on November 28, 1952, the first being the one involved in the application No. 646,934 for Controlled Conveyor Driving Mechanism and Method, filed on March 18, 1957.

The major object of the invention involved in the application No. 322,951 is to provide a conveyor comprising an endless conveyor chain, guides defining an orbit of travel for said chain, a plurality of sprockets engaging the chain at longitudinally spaced points and driving means arranged to synchronously rotate said sprockets to simultaneously supply driving forces to said chain at said spaced points.

The aim "to simultaneously supply—said sprockets—driving forces to said chain at said spaced points" of the above generic concept, in the original application No. 322,951 is fulfilled by a mechanical arrangement allowing a relative circumferential displacement of the conveyor chain sprockets, so that their teeth are held in a uniformal contact with the pins of the conveyor chain to exert, during the rotation of said sprockets, simultaneously a uniformal pressure on the same in the direction of motion of the conveyor chain.

In the dependent application No. 646,934, said aim is fulfilled by mechanical arrangement allowing the accumulation of forces in springs tending to rotate relatively the conveyor chain sprockets in the direction of movement of the conveyor chain. The additional feature of the application No. 646,934 resides in that, while in the conveyor of the application No. 322,951 if a wear of the conveyor chain at the points of contact of the pins with the link-plates takes place, the re-establishment of the simultaneity, according to the aim of said concept, can be obtained only when the conveyor chain is at rest, in the application No. 646,934, it is restored automatically while the conveyor chain is in motion, due to the potential forces accumulated in the springs, pushing, as is said, the sprockets to rotate in the direction of motion of the conveyor chain.

In both applications No. 322,951 and No. 646,934, the said relative circumferential displacement, in the first, and the said accumulation of forces in springs, in the second, are both obtained while the conveyors are at rest.

The major object of the invention involved in the present application is to provide an endless-chain conveyor comprising an endless conveyor chain, guide means defining a path of movement for the chain, a plurality of sprockets engaging the chain at longitudinally spaced points and driving means arranged to synchronously rotate said sprockets to simultaneously supply driving forces to said chain at said spaced points and to regulate and control the extent of said forces during the operation of the conveyor.

Other objects, advantages and features of the present invention will become apparent from the following detailed description of the invention considered in conjunction with the accompanying drawings, wherein.

Figure 1:
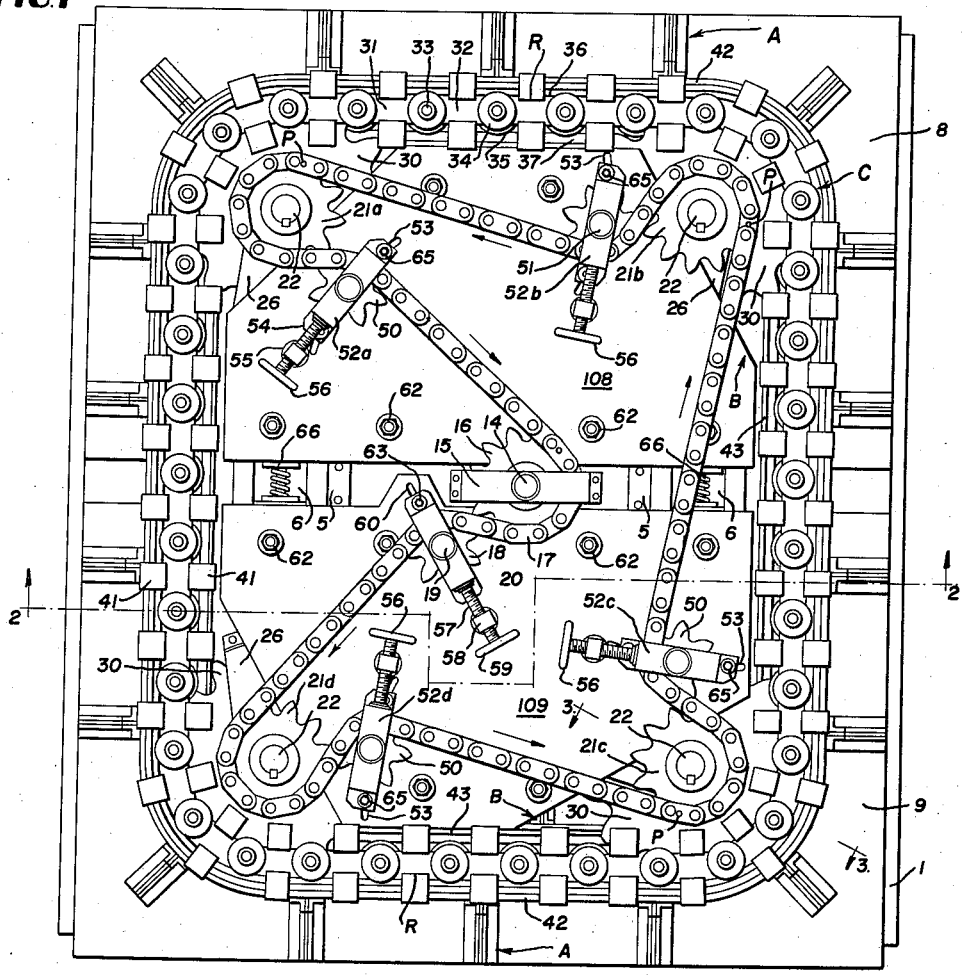
Fig. 1 is a top plan view illustrating the invention.
Figure 2:
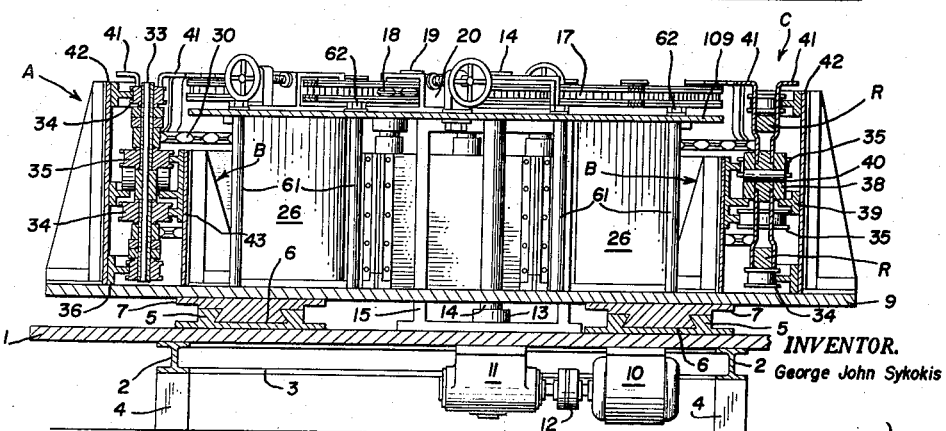
Fig. 2 is a traverse sectional elevation taken substantially on the broken line 2—2 of Fig. 1.
Figure 3:
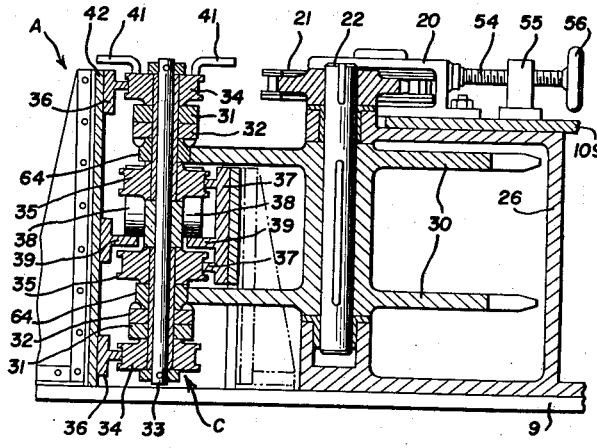
Fig. 3 is a cross-sectional view taken in the line 3—3 of Fig. 1.

In the conveyor shown in Fig. 1, the table 1 is supported through a frame consisting of the double T beam form 2 and 3 on the bases 4, Fig. 2. Two forms 5 parallel and having each a prismatic slide 6 are mounted at length on the table 1. Forms 7, having prismatic projections, fitting in the slides 6, are adjusted under the tables 8 and 9. Thus tables 8 and 9 may translate slidable with respect to table 1. The driving motor 10, under the table 1 in combination with the reducer 11 and the joints 12 and 13, rotates the shaft 14 in the bearing 15 mounted on the table 1. Sprocket 16 is splined on shaft 14. The power chain 17 engages sprocket 16 and in continuation the tensioning sprocket 18 on the shaft 19 held by the support 20. Chain 17 engages also four sprockets 21 splined on four shafts 22, Fig. 1, Fig. 3. On the shaft 22 are also splined four sprockets consisting each of two toothed plates 30. Sprockets 30, 30 are engaged by the conveyor chain which in Fig. 1, Fig. 2, Fig. 3 is denoted by the letter C. Shafts 22, carrying the sprockets 21 and 30, 30, are held by and rotate in the bearings 26. For distinction the four sprockets 21 will be marked as 21a, 21b, 21c and 21d, successively.

Chain C comprises the outer and inner link-plates 31 and 32 coupled by the pivot pins 33. On pins 33 two rollers 34 and two rollers 35 are placed, rotating freely about the pins 33, and touching the pairs of guides 36 and 37, respectively. Thus the conveyor chain C is supported on both sides of the plane passing axially through the pins 33 and on both sides of the plane cutting the previous plane, so that the intersection of these two planes is parallel to the pairs of guides 36 and 37. Additional support of the chain is accomplished through pairs of rollers 38 placed in every pitch of the conveyor chain and rotating each pair about a shaft 40 mounted on brackets 41 destined to carry the loads of the conveyor. Brackets 41 are mounted on the outer and inner link-plates 31 and 32 in the places R in the middle of said link-plates. The pairs of rollers 38 touch the pair of guides 39. The two guides 36 and one guide 39 are mounted on the plate 42 supported on a number of forms A well known in the art. The other two guides 37 and the one guide 39 are mounted on the plates 43 supported on forms B, similar to forms A, Fig. 1, Fig. 2, Fig. 3. In Fig. 1 small parts of forms B are shown, the remaining being hidden by the plates 108 and 109.

The two guides 37 and the one guide 39 supported through the plates 43 on the forms B, in the regions round the sprockets 30, 30, continue concentrically to the two guides 36 and the other guide 39 and pass through the two toothed plates of the sprockets 30, 30. Thus the support of the conveyor chain C is continuous and uniform throughout the whole length of its closed path and it is accomplished in a substantially complete contact of the rollers 34 and 35 with the guides 36 and 37. The contact of the rollers 38 with the guides 39, owing to the weight of the conveyor chain C is complete.

Chain C is placed within the guides 36, 37, 39 so as not to be strained. This is controlled by the tensioning mechanism 66 causing opposite translations of the tables 8 and 9 by sliding of the prismatic projection of the forms 7 within the slides 6 of forms 5 on the table 1. The conveyor chain C engages the sprockets 30, 30 by means of the rollers 64 placed on the pins 33.

The power chain 17 is moved, actuated as is said by the driving sprocket 16 splined on the driving shaft 14. Chain 17 engages the sprocket 18, splined on shaft 19 held by and rotating freely in the tensioning bearing 20 which moves slidably on the straight-line groove 60 on the plate 109, and in continuation it engages the four sprockets 21a, 21b, 21c and 21d.

As is shown in Fig. 1, chain 17 engages also four sprockets 50 splined on shafts 51 held by and rotating freely in the tensioning bearings 52. The four bearings 52 which are denoted as bearings 52a, 52b, 52c and 52d, move slidably on circular shaped grooves 53, on the plates 109 and 108, having as centers of curvature the points enumerated by the letter P. Plates 109 and 108 are supported firmly on the bearings 26 by means of screws and nuts not shown in Fig. 1 and on the tables 9 and 8 through the bolts 61 and the nuts 62.

Let us assume that the tensioning bearing 20 and the four tensioning bearings 21a, 21b, 21c, 21d are regulated so that the chain 17 is neither in tension nor slack. The arrangement shown in Fig. 1 provides that chain 17 moves in the direction shown by the arrows, which is contrary to the direction of the hands of the watch. Chain 17 during its motion rotates the four sprockets 21a, 21b, 21c, 21d. The four sprockets 30, 30 of the conveyor chain C rotate also in synchronism as being splined together with sprockets 21a, 21b, 21c and 21d on the same shafts respectively. By the arrangement of the four tensioning bearings 52a, 52b, 52c and 52d, the aim, of the exerting of a regulated pressure simultaneously in the direction of movement of the chain C by the teeth of the sprockets 30, 30 on the pins 33 of the chain C, is obtained. For this purpose first the chain 17 is strained by the tensioning bearing 52a which moves slidably in the circular groove 53 pushed by the screw 54 screwed on the support 55 by appropriate rotations of the wheel 56 fixed on the one end of screw 54. This straining as is apparent from Fig. 1, while causing a certain regulated circumferential displacement of the sprocket 21a has no influence on the sprocket 16, because, as is said, the circular groove 53 has as center of curvature the point P which is selected to be at the beginning of the engagement of the chain 17 with the sprocket 16. This prevents the appearance of any turning-force acting on the sprocket 16. In continuation chain 17 is strained by the tensioning bearing 52b in a similar way as it was strained by the tensioning bearing 52a, the only difference being that the bearing 52b, in the straining of the chain 17 is pulled by its screw 54 while the bearing 52a is pushed by its screw 54. The straining by the tensioning bearing 52b while causing a certain regulated circumferential displacement of the sprocket 21b, has no influence on the sprocket 21a because the circular groove 53, guiding the removal of the tensioning bearing 52b, has as center of curvature the point P which is selected to be on the tangent of the sprocket 21a at the beginning of the engagement of the chain 17 with the sprocket 21a. In the same way the straining of the chain 17 is effected by the tensioning bearings 52c and 52d causing also a certain regulated circumferential displacement of the sprockets 21c and 21d, respectively. After the straining described of the chain 17 the bolt and nuts 65 stabilize the place of the tensioning bearings 52a, 52b, 52c and 52d.

By this manner of straining of the chain 17, causing, as is said, a certain regulated circumferential displacement of the sprockets 21a, 21b, 21c, 21d, a desirable circumferential displacement of all the sprockets 30, 30 of the conveyor chain C in the direction of its movement can be obtained, because sprockets 21a, 21b, 21c, 21d and the four sprockets 30, 30 of the conveyor chain C are splined in pairs on the four shafts 22. This allows the teeth of the sprocket 30, 30 to exert simultaneously desirable regulated pressures on the pins 33 of the chain C or what amounts to the same to simultaneously supply the sprockets 30, 30, during the operation of the conveyor in Fig. 1, driving forces to the chain C at spaced points, where the sprockets 30, 30 act. This has as a result the reducing of the deterioration of the chain to a minimum, as is provided by the present invention.

After the described straining the part of the chain 17, between the sprocket 21d and the driving sprocket 18, is strained by the bearing 20 which moves slidably on the straight-line groove 60 pushed by the screw 57 screwed in the support 58 by rotations of the wheel 59 fixed on the one end of the screw 57. By the nut and the bolt 63 the position of the bearing 20 on the plate 109 is fixed.

Figure 4:
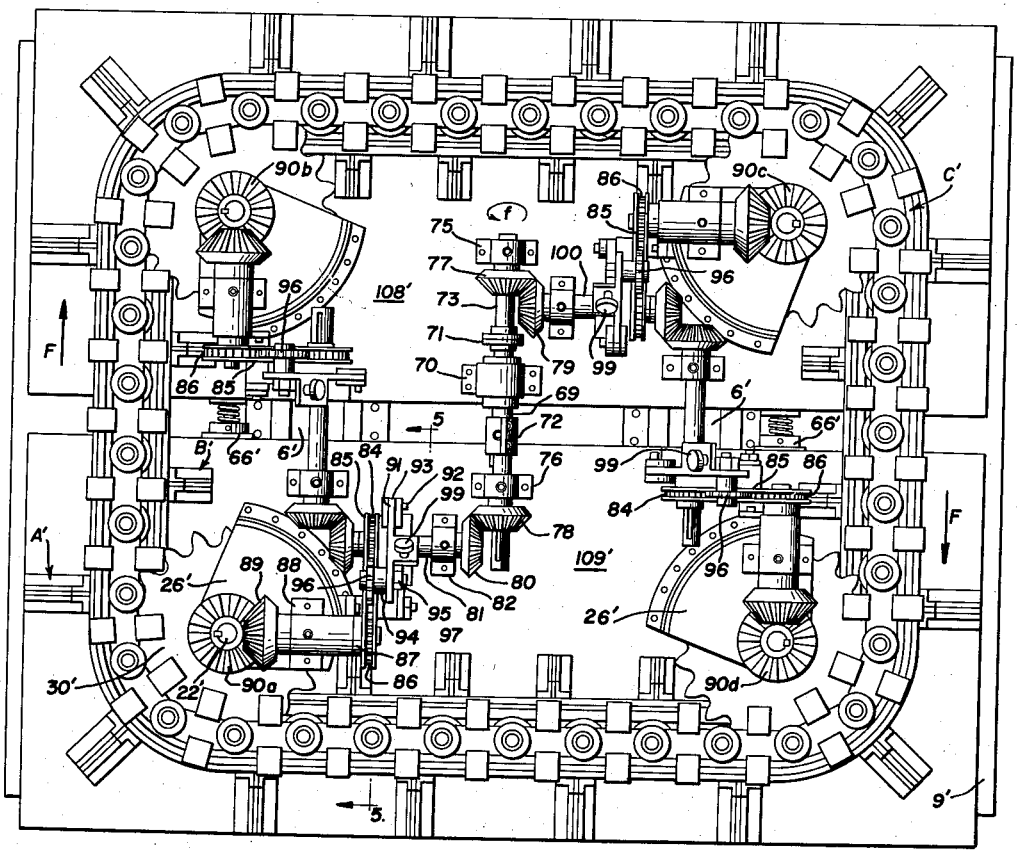
Fig. 4 is a top plan view illustrating a modified form of the invention.

In the modified form of the present invention, shown in Fig. 4, it is also provided that the teeth of the conveyor chain sprockets exert pressures simultaneously on the pins of the conveyor chain in the direction of its motion as happens in Fig. 1. The conveyor chain of the conveyor in Fig. 4 is the same as the conveyor chain of the conveyor in Fig. 1. For this reason it will not be described but will be referred to merely as conveyor chain C'. In the same manner an accent mark will be applied to all the elements in Fig. 4 which are the same as those in Fig. 1.

The conveyor chain C' in Fig. 4, is supported, as in Fig. 1 by a number of forms A' and B' being fixed on the tables 109' and 108' which slide on the prismatic slides 6', fixed on the table 9', pushed and pulled by the tensioning mechanisms 66'. The shaft 69 of the driving motor 70 is connected, on both sides of the motor, with worn reducer not shown in Fig. 4, and then through the joints 71 and 72 with the shafts 73 and 74, which are supported by and rotate in the bearings 75 and 76, respectively. On shafts 73 and 74 are splined the toothed wheels 77 and 78 forming with the toothed wheels 79 and 80 two bevel gears. The toothed wheel 80 is splined on shaft 81 which is supported by and rotates in bearings 82 and 83, Fig. 4 and Fig. 5. On the shaft 81 and at the other side of the bearing 83, the sprocket 84 is splined connected drivingly with the sprocket 86 by means of the chain 85. Sprocket 86 is splined on shaft 87 supported by and rotating in the bearing 88. On shaft 87 at the other side of the bearing 88 is splined the toothed wheel 89 and on shaft 22' is splined the toothed wheel 90a. The toothed wheel 89 and 90a form a bevel gear. On the shaft 22' is also splined the sprocket 30', 30' of the conveyor chain C'. Shaft 22' is supported by and rotates in the bearing 26'. The bearing 83 has a forked element in which fits freely the one end of the arm 93. The pin 92 passes through the forked element and said end of the arm 93. Thus arm 93 can swing round pin 92. At the other side of the arm 93 is mounted the shaft 94 fastened by the nut 95. On the shaft 94 rotates precisely the sprocket 96. At the side of the bearing 26' is mounted the projection 97 which has a pin into which fits the eye formed by one part of the screw 98, Fig. 5. The other part of the screw 98 passes through a suitably broadened place of the arm 93. On this part of the screw after its passing the broadened place of the arm 93, the regulating nut 99 is screwed.

Figure 5:
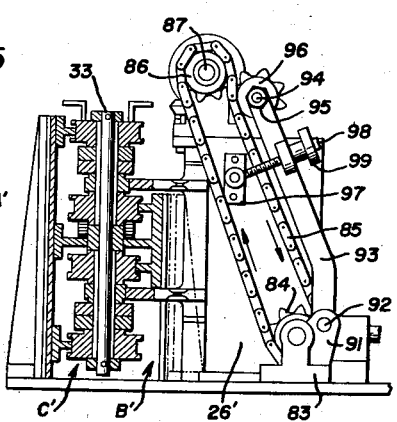
Fig. 5 is the cross-sectional view taken substantially in the line 5—5 of Fig. 4.

As is apparent from Fig. 5, if by turning the regulating nut 99 a pressure on the chain 85 is exerted by sprocket 96, this pressure while causing a certain circumferential displacement of the sprocket 86, has no influence on the sprocket 84 because the pin 92, on which arm 93 swings is provided to be on the tangent of the sprocket 84 exactly on the point where begins the engagement of the sprocket 84 by chain 85. The circumferential displacement of the sprocket 86 by means of the bevel gears 89, 90a causes a certain circumferential displacement of the sprocket 30', 30' of the conveyor chain C'. As is clear from Fig. 4, the driving and regulating arrangement described, terminating in the toothed wheel 90a, are exactly the same with the driving and regulating arrangements which terminate in the toothed wheels 90b, 90c, and 90d.

The driving shaft 69 through the bevel gears 77, 79 and 78, 80 makes shafts 81 and 100 into driving shafts as well.

Shafts 81 and 100 rotate the toothed wheels 90a, 90b, 90c and 90d all in the same direction. As shown in Fig. 4 driving means are provided to be so arranged that when the driving shaft 69 rotates in the direction of the arrow "f," the four sprockets 84 rotate in the direction of the hands of the watch, and thus the regulating sprockets 96 on the arms 93 act on the part of the chains 85 which is pulled by the sprockets 84.

Let us assume that the driving system of the conveyor in Fig. 4 is put in operation. Then all the sprockets 30', 30' will rotate synchronously in righthanded direction. But how many sprockets 30', 30' by which the conveyor chain C' is driven or, in another way, the teeth of which of the sprockets 30', 30' exert pressure simultaneously on the pins 33' of the chain C', is indefinable. The most likely assumption is, as in the conveyor in Fig. 1, for only the teeth of one sprocket 30', 30' to exert pressure on the pins 33' of the chain C'. By the regulating system described, that is by turning of the regulating nuts 99 through which the pressure of the sprockets 96 on the chains 85 are regulated and per consequence, the magnitude of the circumferential displacements of the sprockets 86 which terminate in the circumferential displacement of the sprockets 30', 30' in the direction of motion of the chain C', are regulated, it is obtained for the teeth of the sprockets 30', 30' to exert simultaneously desirable pressures on the pins 33' of the conveyor chain C', or what amounts to the same it is obtained to simultaneously supply the sprockets 30', 30' during the operation of the conveyor in Fig. 4, driving forces to the chain C' at spaced points where the sprockets 30', 30' act. This has as a result the reducing of the deterioration of the chain to a minimum as is provided by the present invention.

If the screw 98, in Fig. 5, instead of terminating in an eye adapted on the bearing 26, is cut and terminates near the arm 93 and if the end of the so cut screw 98 is joined to the projection 97 at the bearing 26 by an elicoidal spring having a pointer, the magnitude of the exerted pressure of the sprocket 96 on the chain 85 can be controlled or, by reducing the pressure of the teeth of the sprockets 30', 30' on the pins 33' of the chain C' can be controlled by the indications of the said pointer on scale mounted suitably on an immovable place. In a similar way, in Fig. 1, by insertion of springs, pointers and scales in suitable places in the tensioning bearings 52a, 52b, 52c, 52d the pressure of the teeth of the sprockets 30', 30' on the pins 33' of the chain C' can also, by reduction of the indication of the pointer on the corresponding scales, be controlled with precision.

In Fig. 1 and Fig. 4, the shape of the path between the conveyor chain sprockets is of rectilinear shape. It is possible, however, in this region for the path to be of a curvilinear shape either concave or convex.

In the present specification, in conjunction with the accompanying drawing, a conveyor chain of two modifications of a conveyor is presented, supported and guided accurately on opposite guide rails and being supplied simultaneously with driving forces by several conveyor chain sprockets spaced longitudinally of the path of the conveyor chain which, during the operation of the conveyors rolls precisely within said guide rails under the influence of the forces supplied by said sprockets. This combination, that is, the accuracy of the support of the conveyor chain and its precise motion under the influence of several forces, decreases the deterioration of the conveyor chain at the minimum proportionally to the number of the conveyor chain sprockets, given that the accuracy of the support is the most precise. This combination constitutes the major object of the present invention as well as of the invention involved in the application No. 646,934 for Conveyor Driving Mechanism and method, which both are filed as continuation in parts of the application No. 322,951 for Conveyor Driving Mechanism.

What I claim is:

1. A conveyor comprising an endless conveyor chain adapted to move in a driving direction, drive means for guiding said conveyor chain during driving movement, a plurality of chain sprockets having teeth drivingly engaging said conveyor chain at spaced points therealong, a drive sprocket drivingly connected to each of said chain sprockets, a driving means, driving chain means drivingly connected to said driving means and said driving sprockets for synchronously rotating said drive sprockets and the associated chain sprockets upon driving movement of said driving means, and tension means including an adjustable portion engaging a lateral portion of said driving chain means intermediate two of said drive sprockets, said tension means being positioned a substantially greater distance from a first one of said two drive sprockets than from a second one of said two drive sprockets, guide means engaging said tension means and constraining said tension means for movement along an arc having a center of curvature positioned at the tangential point of driving engagement of said driving chain means with said first drive sprocket for regulating the pressure of the teeth of the chain sprocket associated with said second drive sprocket against said conveyor chain while having substantially no influence on said first drive sprocket and its associated chain sprocket.

2. Apparatus as defined in claim 1, wherein plate means is provided in fixed relationship to said drive sprockets, said plate means having a slot therein defining said guide means, said tension means including a position positioned within and guided by said slot means.

3. Apparatus as defined in claim 2, wherein said tension means comprises a screw element operatively connected with said adjustable portion, said adjustable portion including a sprocket engaging said driving chain means.

4. A conveyor comprising an endless conveyor chain, a plurality of chain sprockets having teeth drivingly engaging said conveyor chain at spaced points therealong, a pair of drive sprockets drivingly connected to each of said chain sprockets, a driving means, driving chain means drivingly connected to said driving means and said drive sprockets for synchronously rotating said drive sprockets and associated chain sprockets upon driving movement of said driving means, and tension means associated with each of said pairs of drive sprockets, each of said tension means including an arm having a sprocket rotatably mounted at one end thereof and engaging the associated driving chain means adjacent one of the driving sprockets of the associated pair of drive sprockets, the opposite end portion of the arm being pivotally mounted about an axis passing through the tangential point of driving contact between the driving chain means and the other sprocket of the associated pair of drive sprockets and means for adjusting the pivotal position of the arm, whereby pivotal movement of the arm regulates the pressure of the teeth of the associated chain sprocket against the conveyor chain without causing any substantial movement of said other one of the pair of drive sprockets.

References Cited in the file of this patent

UNITED STATES PATENTS

| | | |
|---|---|---|
| 85,012 | King | Dec. 15, 1868 |
| 365,171 | Dodge | June 21, 1887 |
| 1,118,976 | Wachs et al. | Dec. 1, 1914 |
| 2,778,235 | Amonsen | Jan. 22, 1957 |
| 2,787,366 | Sykokis | Apr. 2, 1957 |